US012686779B2

(12) United States Patent
Hata et al.

(10) Patent No.: US 12,686,779 B2
(45) Date of Patent: Jul. 21, 2026

(54) STEEL SHEET, COATED STEEL SHEET, PRESS-FORMED PRODUCT, PROCESSED MEMBER, METHOD FOR MANUFACTURING PRESS-FORMED PRODUCT, AND METHOD FOR MANUFACTURING PROCESSED MEMBER

(71) Applicant: JFE Steel Corporation, Tokyo (JP)

(72) Inventors: Kentaro Hata, Tokyo (JP); Minako Morimoto, Tokyo (JP); Shinji Otsuka, Tokyo (JP); Shusaku Takagi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 39 days.

(21) Appl. No.: 18/841,852

(22) PCT Filed: Jan. 19, 2023

(86) PCT No.: PCT/JP2023/001450
§ 371 (c)(1),
(2) Date: Aug. 27, 2024

(87) PCT Pub. No.: WO2023/171143
PCT Pub. Date: Sep. 14, 2023

(65) Prior Publication Data
US 2025/0171649 A1    May 29, 2025

(30) Foreign Application Priority Data
Mar. 8, 2022    (JP) ................................. 2022-035043

(51) Int. Cl.
*C09D 7/61* (2018.01)
*C09D 133/06* (2006.01)
*C09D 163/00* (2006.01)

(52) U.S. Cl.
CPC ............. *C09D 7/61* (2018.01); *C09D 133/06* (2013.01); *C09D 163/00* (2013.01)

(58) Field of Classification Search
None
See application file for complete search history.

(56) References Cited

U.S. PATENT DOCUMENTS

2023/0193479 A1    6/2023  Hashizume et al.

FOREIGN PATENT DOCUMENTS

CA        2531616 A1 *   6/2006  ............. C22C 38/02
JP        S6145893 A      3/1986
(Continued)

OTHER PUBLICATIONS

Int'l Search Report (PCT/ISA/210) w/ translation & Written Opinion (PCT/ISA/237) mailed on Mar. 20, 2023, by the Japanese Patent Office in Int'l App. No. PCT/JP2023/001450. (8 pages).
(Continued)

*Primary Examiner* — Alexander M Weddle
(74) *Attorney, Agent, or Firm* — Buchanan Ingersoll & Rooney PC

(57) ABSTRACT

A member that is a press-formed product formed from a high strength steel sheet, and a coated steel sheet including a high strength steel sheet as a substrate, are disclosed. The steel sheet includes an outer coating disposed on a surface, and the outer coating includes an organic resin and an inorganic material. The steel sheet has a tensile strength of 1180 MPa or greater. In the outer coating, a concentration of the inorganic material in a region of the outer coating, which is a region extending to 20% of a thickness of the outer coating from a steel-sheet-side, is higher than a concentration of the inorganic material in another region of the outer coating, which is a region extending to 20% of the thickness from an outer-surface-side.

16 Claims, 2 Drawing Sheets

(56) References Cited

FOREIGN PATENT DOCUMENTS

| | | | | | |
|---|---|---|---|---|---|
| JP | 2004231992 | A | 8/2004 | | |
| JP | 2010090444 | A | 4/2010 | | |
| JP | 2011001610 | A | 1/2011 | | |
| JP | 2017125228 | A | 7/2017 | | |
| JP | 2017125229 | A | 7/2017 | | |
| JP | 2018-188707 | A | 11/2018 | | |
| JP | 2018168467 | A | 11/2018 | | |
| WO | WO-2020121899 | A1 * | 6/2020 | .............. | C23C 2/28 |
| WO | 2021200412 | A1 | 10/2021 | | |
| WO | 2021/241338 | A1 | 12/2021 | | |

OTHER PUBLICATIONS

Extended European Search Report issued Apr. 16, 2025, by the European Patent Office in corresponding European Patent Application No. 23766323.2-1103. (10 pages).

Office Action (Notice of Reasons for Refusal) issued Jun. 4, 2024, by the Japan Patent Office in corresponding Japanese Patent Application No. 2023-519812 and an English translation with Concise Statement of Relevance of the Office Action. (7 pages).

Office Action (Request for the Submission of an Opinion) issued Mar. 2, 2026, by the Korean Intellectual Property Office in corresponding Korean Patent Application No. 10-2024-7029256 and an English translation with the Concise Statement of Relevance of the Office Action. (12 pages).

* cited by examiner

STEEL SHEET, COATED STEEL SHEET, PRESS-FORMED PRODUCT, PROCESSED MEMBER, METHOD FOR MANUFACTURING PRESS-FORMED PRODUCT, AND METHOD FOR MANUFACTURING PROCESSED MEMBER

CROSS REFERENCE TO RELATED APPLICATIONS

This is the U.S. National Phase application of PCT/JP2023/001450, filed Jan. 19, 2023 which claims priority to Japanese Patent Application No. 2022-035043, filed Mar. 8, 2022, the disclosures of these applications being incorporated herein by reference in their entireties for all purposes.

FIELD OF THE INVENTION

The present invention relates to a steel sheet, a coated steel sheet, a press-formed product, and a processed member that have excellent delayed fracture resistance. Aspects of the present invention primarily relate to a steel sheet, a coated steel sheet, a press-formed product, and a processed member that are suitable for automobiles and reinforcing members for construction materials; in particular, the steel sheet has a tensile strength of 1180 MPa or greater, the coated steel sheet includes such a steel sheet as a substrate, and the press-formed product and the processed member are those in which any of these steel sheets are used.

BACKGROUND OF THE INVENTION

Automotive steel sheets include cold rolled steel sheets and galvanized cold rolled steel sheets, such as hot-dip galvanized steel sheets (GI), hot-dip galvannealed steel sheets (GA), and electrogalvanized steel sheets (EG); these are conventionally used in response to demand for thickness accuracy and flatness. In recent years, from the standpoint of reducing $CO_2$ emissions from automobiles and ensuring vehicle safety, attempts have been made to increase the strength of automotive steel sheets.

It is known, however, that as the strength of steel materials increases, a delayed fracture is more likely to occur. In particular, this tendency is prominent in the case of high strength steel materials having a tensile strength of 1180 MPa or greater.

The "delayed fracture" is a phenomenon in which when a high strength steel material experiences a static load stress (load stress lower than or equal to a tensile strength), and a certain period of time has elapsed in that state, a brittle fracture suddenly occurs, without being substantially accompanied by plastic deformations as externally observed.

It is known that in the case of steel sheets, the delayed fracture is caused by a residual tensile stress and hydrogen brittleness of steel at a stress concentration area that occur when press forming, in which a steel sheet is formed into a predetermined shape, is performed. Most likely initiation sites for the delayed fracture include a sheared end face resulting from a pre-press-forming blanking or trimming process. It is believed that the hydrogen that causes the hydrogen brittleness is, in most cases, hydrogen that enters the steel from an external environment and diffuses in the steel. Typically, the hydrogen is produced by the corrosion of the steel sheet and then enters the steel and diffuses in the steel. In recent years, various proposals have been made as to methods for evaluating a delayed fracture that occurs in a 1180 MPa or greater-grade high strength steel sheet. Examples include a method for evaluating a delayed fracture resistance by using a test specimen (steel sheet) that has been U-bent after being subjected to shearing. The sheared end face of sheared steel sheets has strains (strains by work hardening due to contact of the steel sheet with the blade and strains by a residual stress) and microscopic defects due to the strains. The strains and microscopic defects can result in variations in a frequency of occurrence of cracking in the sheared end face of a U-bent steel sheet, and thus, a concern exists over an influence of the sheared end face regarding the delayed fracture resistance. Furthermore, sheared end faces exist in actual automotive members, and, therefore, a delayed fracture due to the strains and microscopic defects in the sheared end faces can be a serious problem.

To prevent the occurrence of the delayed fracture in a high strength steel sheet, Patent Literature 1, for example, discusses reducing a delayed fracture sensitivity by adjusting components.

Furthermore, Patent Literature 2 discusses a high strength hot-dip galvannealed steel sheet in which occurrence of a delayed fracture is prevented.

Furthermore, Patent Literature 3 discloses a technology for inhibiting a delayed fracture by reducing the amount of hydrogen entering a steel sheet by applying a Ni coating or Ni-based alloy coating to a cold rolled steel sheet.

Non Patent Literature 1 discloses a technology for inhibiting a delayed fracture in a constant load test by shot-peening an S45C although the technology does not relate to automotive members.

In addition, Patent Literature 4 and 5 discloses a technology for improving a delayed fracture resistance by shot-peening the sheared end face or the entirety of a steel sheet having a tensile strength of 1180 MPa or greater.

Patent Literature

PTL 1: Japanese Unexamined Patent Application Publication No. 2004-231992

PTL 2: Japanese Unexamined Patent Application Publication No. 6-145893

PTL 3: Japanese Unexamined Patent Application Publication No. 2011-001610

PTL 4: Japanese Unexamined Patent Application Publication No. 2017-125229

PTL 5: Japanese Unexamined Patent Application Publication No. 2017-125228

Non Patent Literature

NPL 1: Yoshihiro Watanabe, Norihiko Hasegawa, and Michio Inoue, Journal of the Society of Materials Science, Japan, Vol. 41, No. 465 (1992), pp. 933-938

SUMMARY OF THE INVENTION

Unfortunately, in the case of Patent Literature 1, the amount of hydrogen entering a steel sheet from an external environment is not changed, and, therefore, the literature is insufficient for inhibiting the occurrence of a delayed fracture.

Furthermore, in the case of Patent Literature 2, although a corrosion resistance can be obtained, excellent delayed fracture resistance cannot be expected because the Fe concentration in the coating is approximately a little over 10%.

Furthermore, in the case of Patent Literature 3, an effect of inhibiting a delayed fracture that is initiated at an ordinary surface portion of a formed product can be produced, but the literature is insufficient for inhibiting a delayed fracture attributable to the sheared end face.

In addition, in the case of Non Patent Literature 1, Patent Literature 4, and Patent Literature 5, the sheared end face can be directly processed, and, therefore, some degree of effect can be expected to be exerted on a delayed fracture. However, none of the literature can be used for formed products having rust-preventive oil or press oil present thereon because the shot media is lumped with oil. Furthermore, the necessity for a machine for shot peening and an increase in the manufacturing cost due to increased process steps are inevitable, which presents technical and economic difficulties.

Aspects of the present invention are provided to solve the above-described problems of the related art, and an object of aspects of the present invention is to effectively inhibit the occurrence of a delayed fracture in a sheared end face of a member of a press-formed product formed from a high strength steel sheet, or a coated steel sheet including a high strength steel sheet as a substrate, and thus in which there is a concern for the occurrence of a delayed fracture.

To solve the above-described problems, the present inventors diligently conducted research and studies regarding means for effectively inhibiting the occurrence of a delayed fracture that is initiated at the sheared end face of a high strength automotive member and, consequently, made the following findings.

(1) In a high strength steel sheet of a 1180 MPa or greater grade or a coated steel sheet including such a high strength steel sheet as the substrate (hereinafter also referred to as a "coated steel sheet"), strains that occur on a surface of the steel sheet in the sheared end portion when the steel sheet is subjected to shearing can be reduced by applying an outer coating to the surface of the steel sheet or the coated steel sheet, the outer coating including an organic resin and an inorganic material and being one in which a concentration of the inorganic material in a region of the outer coating, which is a region extending to 20% of a thickness of the outer coating from a steel-sheet-side, is higher than a concentration of the inorganic material in another region of the outer coating, which is a region extending to 20% of the thickness from an outer-surface-side.

(2) By reducing the strains on the surface of the steel sheet in the sheared end portion, which is specifically achieved by limiting a length of a slide mark that is left on the surface of the outer coating, the occurrence of cracking in the sheared end face of a bent portion that results from processing such as press forming can be inhibited.

(3) By inhibiting the occurrence of cracking in the sheared end face of the bent portion, the occurrence of a delayed fracture can be effectively inhibited.

Aspects of the present invention were completed based on the above-described findings, and are as follows.

[1] A steel sheet including an outer coating disposed on a surface, the outer coating including an organic resin and an inorganic material, the steel sheet having a tensile strength of 1180 MPa or greater, wherein in the outer coating, a concentration of the inorganic material in a region of the outer coating, which is a region extending to 20% of a thickness of the outer coating from a steel-sheet-side, is higher than a concentration of the inorganic material in another region of the outer coating, which is a region extending to 20% of the thickness from an outer-surface-side.

[2] The steel sheet according to [1], wherein the thickness of the outer coating is 0.4 μm or greater.

[3] The steel sheet according to [1] or [2], wherein the steel sheet satisfies one or both of conditions (A) and (B), described below:

(A) in an instance where the steel sheet is sheared, a surface of the steel sheet in a sheared end portion has a slide mark having a length of 0.5 mm or less, and (B) in an instance where the steel sheet is bent, N1 satisfies equation (1), where N1 is the number of cracks formed in a sheared end face, $$(N1/R1) \times T1 \leq 1.0 \tag{1}$$

where N1 is the number of cracks formed in the sheared end face of a bent portion, R1 is a bend radius (mm) of the bent portion in which the number of cracks is evaluated, and T1 is a pre-processing thickness (mm) of the steel sheet.

[4] A coated steel sheet including an outer coating disposed on a surface of a coated layer, the outer coating including an organic resin and an inorganic material, the coated steel sheet including a substrate steel sheet having a tensile strength of 1180 MPa or greater, wherein in the outer coating, a concentration of the inorganic material in a region of the outer coating, which is a region extending to 20% of a thickness of the outer coating from a steel-sheet-side, is higher than a concentration of the inorganic material in another region of the outer coating, which is a region extending to 20% of the thickness from an outer-surface-side.

[5] The coated steel sheet according to [4], wherein the thickness of the outer coating is 0.4 μm or greater.

[6] The coated steel sheet according to [4] or [5], wherein the coated steel sheet satisfies one or both of conditions (C) and (D), described below:

(C) in an instance where the coated steel sheet is sheared, a surface of the coated steel sheet in a sheared end portion has a slide mark having a length of 0.5 mm or less, and (D) in an instance where the coated steel sheet is bent, N2 satisfies equation (2), where N2 is the number of cracks formed in a sheared end face, $$(N2/R2) \times T2 \leq 1.0 \tag{2}$$

where N2 is the number of cracks formed in the sheared end face of a bent portion, R2 is a bend radius (mm) of the bent portion in which the number of cracks is evaluated, and T2 is a pre-processing thickness (mm) of the coated steel sheet.

[7] A press-formed product resulting from press-forming of the steel sheet according to any one of [1] to [3] or the coated steel sheet according to any one of [4] to [6].

[8] A method for manufacturing a press-formed product, the method including the step of press-forming the steel sheet according to any one of [1] to [3] or the coated steel sheet according to any one of [4] to [6].

[9] A method for manufacturing a processed member, the method including the steps of shearing and/or bending the steel sheet according to any one of [1] to [3] or the coated steel sheet according to any one of [4] to [6].

[10] A processed member including the steel sheet according to [1] or [2], wherein the steel sheet satisfies one or both of (A) and (B), described below:

(A) a surface of the steel sheet in a sheared end portion has a slide mark having a length of 0.5 mm or less, and (B) N1 satisfies equation (1), where N1 is the number of cracks formed in a sheared end face, $$(N1/R1) \times T1 \leq 1.0 \tag{1}$$

where N1 is the number of cracks formed in the sheared end face of a bent portion, R1 is a bend radius (mm) of the bent portion in which the number of cracks is evaluated, and T1 is a pre-processing thickness (mm) of the steel sheet.

[11] A processed member including the coated steel sheet according to [4] or [5], wherein the coated steel sheet satisfies one or both of (C) and (D), described below:

(C) a surface of the coated steel sheet in a sheared end portion has a slide mark having a length of 0.5 mm or less, and (D) N2 satisfies equation (2), where N2 is the number of cracks formed in a sheared end face, $$(N2/R2) \times T2 \leq 1.0 \tag{2}$$

where N2 is the number of cracks formed in the sheared end face of a bent portion, R2 is a bend radius (mm) of the bent portion in which the number of cracks is evaluated, and T2 is a pre-processing thickness (mm) of the coated steel sheet.

By using aspects of the present invention in a press-formed product, which is suitably a high strength automotive member, formed from a high strength steel sheet or a coated steel sheet including a high strength steel sheet as the substrate, the occurrence of a delayed fracture that is initiated at a sheared end face of the member can be effectively inhibited.

DETAILED DESCRIPTION OF EMBODIMENTS OF THE INVENTION

Figure 1:
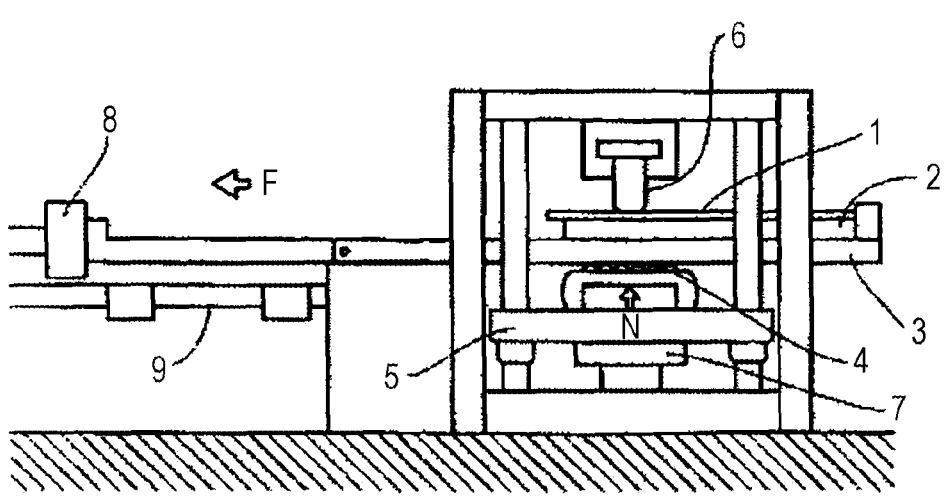
FIG. 1 is a schematic front view of a coefficient of friction measuring apparatus.

Embodiments of the present invention will be described in detail below.

In accordance with aspects of the present invention, a steel sheet or a steel sheet serving as a coating substrate (the "steel sheet or the steel sheet serving as a coating substrate" is referred to as a "base steel sheet") is a steel sheet that serves as a base of a high strength member and has a tensile strength of 1180 MPa or greater. The tensile strength is preferably 1200 MPa or greater and more preferably 1320 MPa or greater. The tensile strength is preferably not greater than 2000 MPa because, for example, increased strength results in reduced formability.

A steel sheet having low tensile strength or a coated steel sheet including such a steel sheet as the substrate is inherently unlikely to experience a delayed fracture. The effect according to aspects of the present invention is exhibited even in a steel sheet having low tensile strength or a coated steel sheet including such a steel sheet as the substrate, but the effect is prominently exhibited in a steel sheet having a tensile strength of 1180 MPa or greater or a coated steel sheet including such a steel sheet as the substrate. Furthermore, the effect is more prominently exhibited in a steel sheet having a tensile strength of 1320 MPa or greater or a coated steel sheet including such a steel sheet as the substrate.

A high strength steel sheet or a coated steel sheet including a high strength steel sheet as the substrate that is suitable for use in accordance with aspects of the present invention may have any composition and microstructure as long as the steel sheet has a desired tensile strength. More advantageously, the steel sheet may have undergone any of the following processes.

By way of example, processes (1), (2), and (3), described below, may be used alone or in a combination of two or more, to improve the properties, such as mechanical properties, of the base steel sheet.

(1) Chemical compositional modification, such as solid solution strengthening achieved by adding an interstitial solute element, such as C or N, or adding a substitutional solute element, such as Si, Mn, P, or Cr; precipitation strengthening that utilizes a carbide, a nitride, or a carbonitride of Ti, Nb, V, Al, or the like; and addition of a strengthening element, such as W, Zr, Hf, Co, B, Cu, or a rare earth metal (2) Strengthening that utilizes a transformation structure, such as strengthening achieved by performing recovery annealing at a temperature at which recrystallization does not occur; partial recrystallization strengthening achieved by not fully recrystallizing the microstructure, thereby retaining a non-recrystallized region; and formation of a single phase of bainite or martensite or formation of a composite microstructure of either of these transformation structures and ferrite (3) Textural or structural modification, such as grain-refining strengthening that utilizes the Hall-Petch equation, $\sigma = \sigma_0 + kd^{-1/2}$, assuming that a grain size of ferrite is d (in the equation, $\sigma$ is a stress, and $\sigma_0$ and k are material constants); and strengthening by work that utilizes rolling or the like Examples of the composition of the high strength steel sheet include a composition containing, in mass %, C: 0.1 to 0.5%, Si: 0 to 3.0%, Mn: 1 to 10%, P: 0 to 0.05%, and S: 0 to 0.005%, with the balance being Fe and incidental impurities, with the composition optionally containing one or more of Cu, Ti, V, Al, Cr, Ni, and the like.

Examples of commercially available high strength steel sheets having any of the tensile strengths mentioned above include JFE-CA1180, JFE-CA1370, JFE-CA1470, JFE-CA1180SF, JFE-CA1180Y1, and JFE-CA1180Y2 (all manufactured by JFE Steel Corporation).

In accordance with aspects of the present invention, the steel sheet that serves as the base (base steel sheet) may have any thickness. Preferably, the thickness is greater than or equal to 0.8 mm. More preferably, the thickness is greater than or equal to 1.2 mm. The upper limit of the thickness of the steel sheet (base steel sheet) is preferably less than or equal to 2.5 mm and more preferably less than or equal to 2.0 mm.

Regarding the coating treatment performed on the steel sheet, the type of the coating metal is not particularly limited, and any common method, such as hot-dip coating, electroplating, or electroless plating, may be employed. The conditions for the coating treatment are not particularly limited, and preferred conditions may be appropriately employed. In instances where a hot-dip galvanizing treatment is performed, it is preferable, in terms of inhibiting dross formation, that the galvanizing bath contain Al added thereto. In this instance, additional element components, other than Al, that may be added to the galvanizing bath are not particularly limited. That is, the effect according to aspects of the present invention is not impaired even when Pb, Sb, Si, Sn, Mg, Mn, Ni, Ti, Li, Cu, and/or the like are present or added in addition to Al.

In addition, an alloying treatment may be performed after hot-dip galvanizing is performed. In accordance with aspects of the present invention, the conditions for the alloying treatment are not particularly limited, and preferred conditions may be appropriately employed. The steel sheet may either be a steel sheet that has undergone a zinc-based coating treatment or a steel sheet that has undergone a zinc-based coating treatment and thereafter an alloying treatment.

Furthermore, a high strength member according to aspects of the present invention may be formed by any method and may have any shape. The effect of inhibiting a delayed fracture is exhibited even in a commonly used forming process.

In accordance with aspects of the present invention, the delayed fracture resistance was evaluated with a member produced by performing shearing and thereafter bending; this was to simulate a high strength automotive member that is formed by press forming, into a side sill, a B-pillar, or a bumper.

In accordance with aspects of the present invention, shearing is to be performed via an outer coating, which makes it possible to reduce strains in a portion of the base steel sheet, which lies under the outer coating, that comes into contact with a shearing blade, thereby enabling inhibition of a delayed fracture; the outer coating is to be positioned between the blade and the steel sheet that is to be sheared or a coated steel sheet including the steel sheet as the substrate, and the outer coating includes an organic resin and an inorganic material and is one in which a concentration of the inorganic material in a region extending to 20% of a thickness of the outer coating from a base-steel-side (steel-sheet-side) is higher than a concentration of the inorganic material in another region of the outer coating, which is the region extending to 20% of the thickness from an outer-surface-side. Accordingly, it is necessary to include the outer coating, which includes an organic resin and an inorganic material and in which the concentration of the inorganic material in the region extending to 20% of the thickness from the base-steel-side (steel-sheet-side) is higher than the concentration of the inorganic material in another region of the outer coating, which is the region extending to 20% of the thickness from the outer-surface-side. Preferably, a ratio between the concentrations is greater than or equal to 1.5. The ratio is more preferably greater than or equal to 1.7 and most preferably greater than or equal to 2.0. Preferably, the upper limit thereof is less than or equal to 2.5. It is speculated that the mechanism that reduces strains on the surface (slide mark 10) of the base steel sheet in a sheared end portion is, specifically, as follows.

When the shearing blade comes into direct contact with the surface of a steel sheet or the surface of a coated steel sheet including the steel sheet as the substrate, the portion in contact with the shearing blade receives sliding motion, and as a result, a strain is generated on the surface of the base steel sheet, which causes strain hardening. Consequently, the steel sheet has a textural state that has low deformability. When high-strain processing, such as press forming, is further performed in this state, multiple cracks spanning approximately tens to hundreds of micrometers are formed in an end face of the base steel sheet in a bent portion. Cracks induce stress concentration and, therefore, promote a delayed fracture in press-formed products. Accordingly, an effective way to inhibit a delayed fracture is to reduce strains of the base steel sheet due to contact with the shearing blade, thereby inhibiting the formation of cracks in the end face of the base steel sheet in the bent portion resulting from press forming or the like. In accordance with aspects of the present invention, the outer coating that includes, as described above, an organic resin and an inorganic material is to be disposed between the shearing blade and the surface of a steel sheet or the surface of a coated steel sheet including the steel sheet as the substrate, and, accordingly, the outer coating reduces a coefficient of friction between the shearing blade and the surface of the steel sheet or the surface of the coated steel sheet including the steel sheet as the substrate. As the coefficient of friction decreases, it becomes possible for the inorganic material in the outer coating to disperse and relax a compressive stress that is exerted on the portion that comes in contact during shearing, and, consequently, strains in the base steel sheet can be reduced. As a result, the formation of cracks in the end face of the base steel sheet in the bent portion resulting from press forming or the like can be inhibited, and, accordingly, the occurrence of a delayed fracture can be inhibited.

Figure 3:
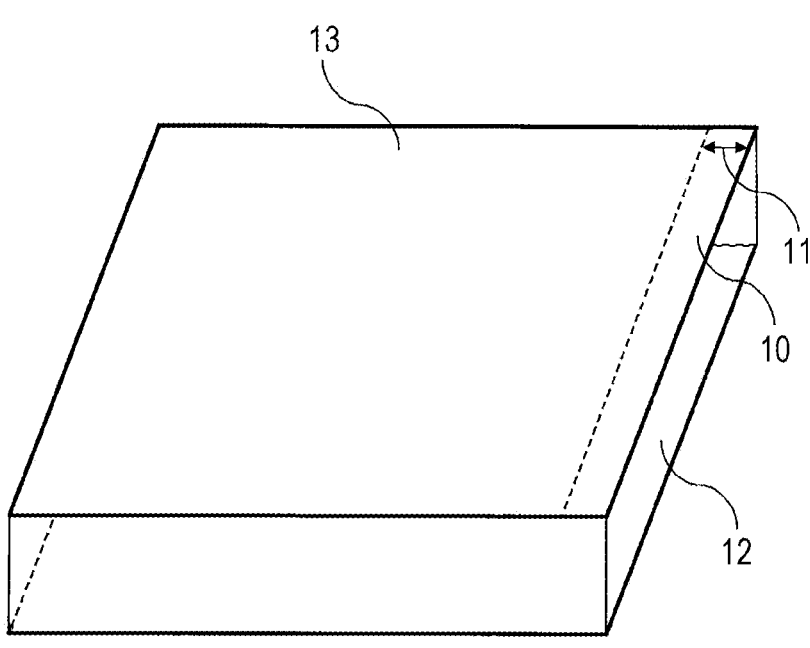
FIG. 3 is a schematic diagram illustrating a region in which a length of a slide mark on a surface of a steel sheet in a sheared end portion is to be observed.

The end portion of a typical material that has been sheared has a slide mark 10, left in the area of contact with the blade, as illustrated in FIG. 3. The slide mark 10 of a steel sheet or a coated steel sheet that has the outer coating is a mark formed on the surface of the steel sheet in the sheared end portion as a result of the contact with the blade, and the slide mark 10 is a strain-hardened portion resulting from a strain generated in the base steel sheet as a result of plastic deformation experienced by the surface of the steel sheet or the surface of the coated steel sheet lying under the slide mark 10. Since the outer coating is provided on the surface of the steel sheet or the surface of the coated steel sheet, the "slide mark 10 formed on the surface of the steel sheet in the sheared end portion" is actually seen on the surface of the outer coating. Furthermore, the surface of the steel sheet in the sheared end portion includes not only the end itself but also a portion located inside of the end, that is, located in the steel sheet or the coated steel sheet. After shearing, when a slide mark length 11 of the surface of the steel sheet in the sheared end portion is small, that means that strains caused by shearing have been dispersed, and thus, that the base steel sheet has reduced strains. Accordingly, it is preferable that the slide mark length 11 be less than or equal to 0.5 mm so that an effect of inhibiting a delayed fracture can be exhibited. When the area of contact with the blade has a large number of strains, the resulting slide mark length 11 exceeds 0.5 mm, and thus, the effect of inhibiting a delayed fracture is reduced. More preferably, the slide mark length 11 is less than or equal to 0.1 mm, and even more preferably, the slide mark length 11 is 0 mm, which means that the slide mark is not generated.

N1 denotes the number of cracks formed in the end face of the steel sheet in a bent portion. N1 is preferably within a range that satisfies the equation below. Regarding the number of cracks N1, the left-hand side of equation (1) is preferably less than or equal to 0.5 and more preferably 0. As strains in the area of contact with the blade decrease, the number of cracks N1 decreases, which results in remarkable inhibition of a delayed fracture. Note that the number of cracks N1 is the number of cracks formed in a sheared end face of the bent portion.

$$(N1/R1) \times T1 \le 1.0 \quad\quad (1)$$

In equation (1), N1 is the number of cracks formed in a sheared end face 12 of a bent portion, R1 is a bend radius (mm) of the bent portion in which the number of cracks is evaluated, and T1 is a pre-processing thickness (mm) of the steel sheet.

N2 denotes the number of cracks formed, during bending, in an end face of a coated steel sheet including the above-described steel sheet as the substrate. N2 is preferably within a range that satisfies the equation below. Regarding the number of cracks N2, the left-hand side of equation (2) is preferably less than or equal to 0.5 and more preferably 0. As strains in the area of contact with the blade decrease, the number of cracks N2 decreases, which results in remarkable inhibition of a delayed fracture. The number of cracks N2 is the number of cracks formed in the sheared end face of the bent portion.

$$(N2/R2) \times T2 \le 1.0 \quad\quad (2)$$

In equation (2), N2 is the number of cracks formed in the sheared end face 12 of a bent portion, R2 is a bend radius (mm) of the bent portion in which the number of cracks is evaluated, and T2 is a pre-processing thickness (mm) of the coated steel sheet.

R1 and R2 are radii of the inside of the bent portion. A processing length associated with N1 and N2 is a length of the outside of a bent portion 17, from a bend R terminal portion 18 to another bend R terminal portion 19, illustrated in FIG. 4.

It is preferable that the coefficient of friction of the outer coating be less than or equal to 0.50 so that strains in the sheared end portion can be reduced. When the coefficient of friction is low, a surface pressure between the surface of the steel sheet or the surface of the coated steel sheet and the shearing blade is reduced, and, consequently, strains can be easily reduced. When the coefficient of friction is greater than 0.50, the effect of reducing strains is unlikely to be exhibited. The coefficient of friction of the outer coating is more preferably less than or equal to 0.20 and even more preferably less than or equal to 0.15. On the other hand, when the coefficient of friction is extremely low, the steel sheet may become slippery, and in this regard, it is preferable that the coefficient of friction of the outer coating be greater than or equal to 0.08.

Preferably, the outer coating has a thickness of greater than or equal to 0.4 μm. When the thickness of the outer coating is less than 0.4 μm, the total amount of the inorganic material in the outer coating is small, and, consequently, it is difficult to produce the above-described effect of the inorganic material present in the coating, that is, the effect of reducing strains in the base steel sheet by dispersing and relaxing the compressive stress that is exerted on the portion that comes in contact during shearing. As a result, the effect of inhibiting the occurrence of cracking in the sheared end face 12 of the bent portion resulting from forming is reduced. The thickness of the outer coating is more preferably greater than or equal to 0.5 μm and even more preferably greater than or equal to 1.0 μm. On the other hand, when the thickness of the outer coating is large, it becomes difficult to form a predetermined shape, and costs increase. Accordingly, it is preferable that the thickness of the outer coating be less than or equal to 2.0 mm. The thickness of the outer coating is more preferably less than or equal to 1.0 mm and even more preferably less than or equal to 5.0 μm.

The outer coating not only has the effect of reducing the coefficient of friction between the shearing blade and the surface of the steel sheet or the surface of the coated steel sheet but also has the effect of relaxing the compressive stress associated with shearing, thereby reducing strains on the surface of the base steel sheet. Accordingly, when the range of equation (1) or equation (2) is not satisfied, the effect of inhibiting a delayed fracture is small.

In accordance with aspects of the present invention, the outer coating is an outer coating containing an organic resin and an inorganic material. The type of the outer coating need not be particularly limited, and examples include inorganic-material-containing coatings (inorganic-based coatings) and organic-resin-containing coatings (organic-based coatings). Examples of the inorganic-based coatings include Mn-P-based oxide coatings, Ni-based inorganic coatings, zinc-based oxide coatings, copper-based oxide coatings, and iron-based oxide coatings. Examples of the organic-based coatings include coatings containing a polyvinyl chloride-based resin, a polyethylene-based resin, a polypropylene-based resin, an epoxy resin, a polyhydroxy polyether resin, a polyester resin, a urethane resin, a silicone resin, or an acrylic resin. The outer coating can exhibit its effect by being provided as an organic-inorganic composite coating. A wax may be included to improve lubricity. Examples of the wax include polyolefin waxes, montan waxes, paraffin waxes, microcrystalline waxes, carnauba waxes, lanolin-based waxes, silicone-based waxes, and fluorine-based waxes. One or more of these may be used.

Furthermore, in accordance with aspects of the present invention, the outer coating may be formed by any method. One method is as follows: a treatment liquid (resin solution) in which an organic resin and an inorganic material are dissolved and/or dispersed in a solvent (water and/or an organic solvent) is coated onto the surface of a steel sheet or the surface of a coated steel sheet and subsequently dried by heating.

The resin solution may be coated onto the surface of the steel sheet or the surface of the coated steel sheet by any method, and a method known in the art, such as a coating method, an immersion method, or a spray method may be used; the coating method may use any coating means, such as a roll coater (e.g., 3-roll coater or 2-roll coater), a squeeze coater, or a die coater. Furthermore, after a coating treatment that uses a squeeze coater or the like, an immersion treatment, or a spray treatment is performed, it is possible to adjust the amount of coating, make the appearance uniform, and/or make the thickness uniform by using an air-knife method or a roll squeezing method. The drying by heating of the coated treatment liquid may be carried out by any method. Examples of means that may be used include dryers, hot air ovens, high-frequency induction heating furnaces, and infrared ovens.

The coating is to be performed in a state in which a temperature of the surface of the steel sheet or the coated steel sheet has been increased to a temperature higher than the temperature of the treatment liquid. As a result, convection due to the temperature difference at an interface between the surface of the steel sheet or the coated steel sheet and the treatment liquid is generated in the coated treatment liquid, and thus, the inorganic material, which has high affinity for metals, is accumulated toward the steel sheet side. Accordingly, an outer coating in which the concentration of the inorganic material is varied in the thickness direction is formed. In this instance, the temperature difference between the temperature of the surface of the steel sheet or the coated steel sheet and the temperature of the treatment liquid is preferably 20° C. or greater and 40° C. or less.

In accordance with aspects of the present invention, it is preferable that when a steel sheet or a coated steel sheet is to be cut for press forming, a clearance of the blade for shearing be set to be 0 to 30%. Even when the clearance is 0%, that is, even when fine blanking, which uses a blade clearance of 0.01 mm or less, is employed, it is possible to reduce strains because the outer coating prevents the blade from coming into direct contact with the steel sheet or the coated steel sheet and, in addition, produces a cushioning effect. Accordingly, the clearance is preferably greater than or equal to 0%. The clearance is more preferably greater than or equal to 5% and even more preferably greater than or equal to 10%. On the other hand, when the clearance is greater than 30%, cracking is likely to occur because of a delayed fracture initiated at a burr on the sheared end face 12. Accordingly, the clearance is preferably less than or equal to 30%. The clearance is more preferably less than or equal to 25% and even more preferably less than or equal to 20%.

As referred to in accordance with aspects of the present invention, the "press-formed product" is a press-formed product that can be obtained by press-forming a steel sheet or a coated steel sheet that includes the outer coating in which a concentration of an inorganic material in a region of the outer coating, which is a region extending to 20% of a thickness of the outer coating from a steel-sheet-side, is higher than a concentration of the inorganic material in another region of the outer coating, which another region is a region extending to 20% of the thickness from an outer-surface-side. Examples of the press-formed product include high strength automotive members formed by press forming, such as side sills, B-pillars, and bumpers. Such members have a portion that has been bent with a maximum ratio of bend radius R to thickness t of 4.0 or less.

As referred to in accordance with aspects of the present invention, a "method for manufacturing a press-formed product" is a method for manufacturing the above-described press-formed product, the method including the step of press-forming a steel sheet or a coated steel sheet that includes the outer coating in which a concentration of an inorganic material in a region of the outer coating, which is a region extending to 20% of a thickness of the outer coating from a steel-sheet-side, is higher than a concentration of the inorganic material in another region of the outer coating, which is a region extending to 20% of the thickness from an outer-surface-side. The step of press-forming includes shearing and bending that is performed with a maximum ratio of bend radius R to thickness t of 4.0 or less. Furthermore, the shearing includes blanking performed with a press.

As referred to in accordance with aspects of the present invention, a "processed member" refers not only to the above-described member but also to a processed member that can be obtained by processing a steel sheet or a coated steel sheet that includes the outer coating in which a concentration of an inorganic material in a region of the outer coating, which is a region extending to 20% of a thickness of the outer coating from a steel-sheet-side, is higher than a concentration of the inorganic material in another region of the outer coating, which is a region extending to 20% of the thickness from an outer-surface-side. That is, the "processed member" encompasses steel sheets or coated steel sheets resulting from shearing and steel sheets or coated steel sheets resulting from bending performed after shearing. The shearing includes blanking performed with a press. Furthermore, in the instance where a steel sheet including the above-described outer coating is to be used in the processed member, it is preferable to satisfy one or both of (A) and (B), described below.

(A) A surface of the steel sheet in the sheared end portion has a slide mark having a length of 0.5 mm or less.

(B) N1 satisfies equation (1), where N1 is the number of cracks formed in the sheared end face.

$$(N1/R1) \times T1 \le 1.0 \tag{1}$$

In equation (1), N1 is the number of cracks formed in the sheared end face 12 of the bent portion, R1 is a bend radius (mm) of the bent portion in which the number of cracks is evaluated, and T1 is a pre-processing thickness (mm) of the steel sheet.

Furthermore, in the instance where a coated steel sheet including the above-described outer coating is to be used in the processed member, it is preferable to satisfy one or both of (C) and (D), described below.

(C) A surface of the coated steel sheet in the sheared end portion has a slide mark having a length of 0.5 mm or less.

(D) N2 satisfies equation (2), where N2 is the number of cracks formed in the sheared end face.

$$(N2/R2) \times T2 \le 1.0 \tag{2}$$

In equation (2), N2 is the number of cracks formed in the sheared end face 12 of a bent portion, R2 is a bend radius (mm) of the bent portion in which the number of cracks is evaluated, and T2 is a pre-processing thickness (mm) of the coated steel sheet.

As referred to in accordance with aspects of the present invention, a "method for manufacturing a processed member" is a method for manufacturing the above-described processed member, the method including the steps of shearing and/or bending a steel sheet or a coated steel sheet that includes the outer coating in which a concentration of an inorganic material in a region of the outer coating, which is a region extending to 20% of a thickness of the outer coating from a steel-sheet-side, is higher than a concentration of the inorganic material in another region of the outer coating, which is a region extending to 20% of the thickness from an outer-surface-side. The step of shearing includes the shearing and blanking that is performed with a press. The step of bending includes bending performed with a maximum ratio of bend radius R to thickness t of 4.0 or less and bending performed with a press.

EXAMPLES

Aspects of the present invention will now be described in detail with reference to Examples. The technical scope of the present invention is not limited to the Examples below, and appropriate modifications made within the scope of the primary features are encompassed by the present invention.

Example 1

The substrate steel sheet (base steel sheet) used was a steel sheet having a chemical composition containing, in mass %, C: 0.197%, Si: 0.43%, Mn: 1.56%, P: 0.01%, and S: 0.0005%, with the balance being Fe and incidental impurities or a steel sheet having a chemical composition containing, in mass %, C: 0.459%, Si: 0.20%, Mn: 0.73%, P: 0.01%, and S: 0.0027%, with the balance being Fe and incidental impurities. The steel sheets had a thickness of 0.8 to 2.5 mm.

In instances where a coated layer was to be formed, a Zn-based coating was applied to the substrate steel sheet by using a hot-dip coating method or an electroplating method described below.

<Hot-Dip Coating Method>

Coated steel sheets of type Nos. 54 to 57, shown in Table 2-2, were prepared by immersing a substrate steel sheet in a hot-dip Zn—Fe-based coating bath (bath temperature: 460° C.) or a hot-dip Zn—Al—Mg-based coating bath (bath temperature: 460° C.) in a hot-dip coating line. In addition, coated steel sheets of type Nos. 38 to 53 and 62 to 81, shown in Table 2-2, were prepared by performing the coating described above and subsequently performing an alloying treatment in a direct Joule-heating furnace.

<Electroplating Method>

Coated steel sheets of type Nos. 45 and 46, shown in Table 1, were prepared by forming a zinc-coated layer on a substrate steel sheet by subjecting the substrate steel sheet to an electroplating treatment, which was performed at a current density of 30 $A/dm^2$ for an electroplating time of 45 seconds, in a coating bath (pH: 2.0, bath temperature: 50° C.) made of an aqueous zinc sulfate solution.

The outer coating was formed on the above-described base materials in the manner described below. The types of outer coatings are shown in Table 1. Prior to the formation of the outer coatings, the base material (steel sheet or coated steel sheet) was subjected to alkali degreasing. The resins used were an epoxy resin and an acrylic resin. The inorganic materials used were a zinc-based oxide and a crystalline layered material.

The zinc-based oxide used was a basic zinc sulfate tri- to pentahydrate obtained as follows: steel sheets were immersed in an aqueous zinc sulfate heptahydrate solution at a concentration of 20 g/L and a temperature of 50° C. (the immersion time was 60 seconds for outer coating), and subsequently, the steel sheets were thoroughly washed with water and then dried. The confirmation that the zinc-based oxide was a basic zinc sulfate tri- to pentahydrate was made by performing XRD analysis.

The crystalline layered material used was $[Mg_{0.667}Al_{0.333}(OH)_2][CO_3^{2}]_{0.167} \cdot 0.5H_2O$, which was a crystalline layered material obtained as follows: 31 g/L of an aqueous sodium bicarbonate decahydrate solution was added dropwise to 113 g/L of an aqueous magnesium nitrate hexahydrate solution and 83 g/L of an aqueous aluminum nitrate nonahydrate solution, and the resulting purified precipitate was filtered and dried. The confirmation that the crystalline layered material was $[Mg_{0.667}Al_{0.333}(OH)_2][CO_3^{2}]_{0.167} \cdot 0.5H_2O$ was made by performing XRD analysis.

The inorganic material prepared as described above was mixed with the resin in a mass ratio of 2:10, and the mixture was applied to the samples with a roll coater and baked at 140° C. The outer coating was applied in a state in which a surface temperature of the base material (steel sheet or coated steel sheet) had been increased to a temperature 20° C. higher than the temperature of the treatment liquid for applying the outer coating. The thickness was appropriately controlled by varying the speed of the roll coater. The thickness of the outer coating of the steel sheets and the coated steel sheets was measured. The outer coating was sputtered with an FIB to reveal a 45° cross section, the cross section was then observed with an ultra-low acceleration SEM, and an average of measurements obtained at randomly selected 10 points was determined. In addition, a ratio of the concentration of the inorganic material in the region of the outer coating extending to 20% of the thickness from the steel-sheet-side to the concentration of the inorganic material in the other region of the outer coating extending to 20% of the thickness from the outer-surface-side was determined from average intensity ratios of the inorganic material, which were obtained from SEM-EDS mapping.

Figure 2:
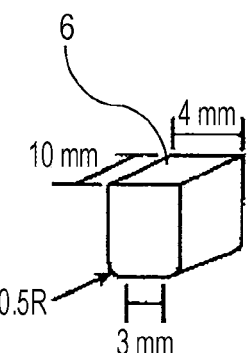
FIG. 2 is a schematic perspective view illustrating a shape and dimensions of a bead illustrated in FIG. 1.

Furthermore, the coefficient of friction of the outer coatings was measured in the following manner. FIG. 1 is a schematic front view of a coefficient of friction measuring apparatus. As illustrated in FIG. 1, a sample 1 for measurement of the coefficient of friction cut from the steel sheet or the coated steel sheet, which included the outer coating formed thereon, was secured to a sample stage 2, and the sample stage 2 was secured to an upper surface of a slide table 3, which was horizontally movable. A slide table support 5, which included a roller 4 and was vertically movable, was provided below a lower surface of the slide table 3, with which the roller 4 was in contact. The slide table support 5 was configured to be raised to cause a bead 6 to be pressed against the sample 1 for measurement of the coefficient of friction at a pressing load N. A first load cell 7, provided to measure the load N, was disposed on the slide table support 5. A second load cell 8 was disposed at one end of the slide table 3 such that the second load cell 8 could move on a rail 9 to measure a sliding resistance force F, which was a force produced when the slide table 3 was moved in the horizontal direction with the pressing force being exerted. A lubricating oil was applied to a surface of the sample 1 for measurement of the coefficient of friction, to perform a test. The lubricating oil used was Preton R352L, which is a cleansing oil for pressing manufactured by Sugimura Chemical Industrial Co., Ltd. FIG. 2 is a schematic perspective view illustrating a shape and dimensions of the bead that was used. The sliding was performed in a state in which a lower surface of the bead 6 was pressed against a surface of the sample 1 for measurement of the coefficient of friction. The bead 6, illustrated in FIG. 2, had a shape in which a width was 10 mm, a length in a sliding direction of the sample 1 for measurement of the coefficient of friction was 4 mm, lower portions at both ends in the sliding direction had a curved surface having a curvature of 0.5 mmR, and a lower surface of the bead against which the sample 1 for measurement of the coefficient of friction was to be pressed was a flat surface having a width of 10 mm and a length in the sliding direction of 3 mm. The test for measuring the coefficient of friction was performed with the bead 6 illustrated in FIG. 2 at a pressing load N of 400 kgf, with a speed for withdrawing the sample 1 for measurement of the coefficient of friction (a speed for horizontally moving the slide table 3) being 100 cm/min. The coefficient of friction, μ, between the sample 1 for measurement of the coefficient of friction and the bead 6 was calculated according to the equation: μ=F/N.

Figure 4:
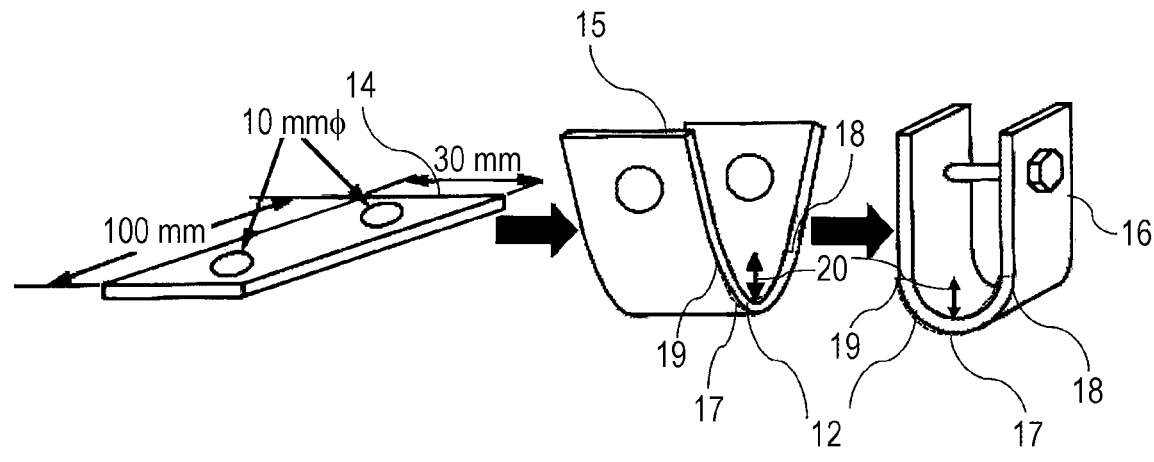
FIG. 4 is a schematic diagram illustrating a test specimen that has undergone bending and bolt tightening.

Furthermore, a test specimen 14 was prepared by shearing the steel sheet or the coated steel sheet, which included the outer coating formed thereon, to produce a piece having dimensions of 100 mm×30 mm. The shearing was performed with a clearance of 5% at a movable blade speed of 1 m/sec. 180° bending was performed with an R of 10 mm, in a manner such that the sheared end face 12 of the prepared test specimen 14 had a fracture surface on the die-side and had a shear surface on the punch-side. For the evaluation of the delayed fracture resistance, a bolt was tightened after the bending so that spring-back due to bending could be offset, and thus, a stress was applied to the outer surface of the bent portion. FIG. 4 schematically illustrates the post-bending test specimen and the post-bolt-tightening test specimen.

(Slide Mark Length)

In the sheared test specimen, a slide mark length 11 that could be observed at a magnification of 100× in a portion in which the blade came in contact with the surface 13 of the steel sheet during shearing (see FIG. 3) was measured at randomly selected 10 points with a microscope manufactured by Keyence Corporation, and an average of the measurements was determined as the slide mark length. Note that the slide mark length may be evaluated in the as-sheared condition (in an unbent condition) or may be evaluated after bending. In the present Examples, for ease of operation, the evaluation was performed on the test specimens after shearing; however, it was confirmed that even in the case where the evaluation was performed after bending, values were not changed.

(Number of Cracks)

The sheared end face 12 of the bent portion 17 of a pre-bolt-tightening and post-bending test specimen 15 was observed with a microscope, manufactured by Keyence Corporation, at a magnification of 100×, to count the number of cracks formed in the sheared end face 12 of the steel sheets and the coated steel sheets each including one of the steel sheets as the substrate. The bent portion 17 was a region that was bent with a bend radius R 20 and was a portion of the bent test specimen extending from the bend R terminal portion 18 to the other bend R terminal portion 19. Cracks with a length of 10 μm or greater were counted as cracks that could affect the delayed fracture resistance. The counting of the number of cracks was performed for the entire area of the sheared end face 12 of the bent portion 17.

Note that the number of cracks may be evaluated before bolt-tightening or after bolt-tightening. In the present Examples, for ease of operation, the number of cracks was evaluated before bolt-tightening; however, it was confirmed that even in the case where the evaluation was performed after bolt-tightening, the number of cracks was not changed.

(Delayed Fracture Resistance)

After the bending, a bolt was tightened so that spring-back due to bending could be offset, and thus, a stress was applied to the outer surface of the bent portion. A post-bolt-tightening test specimen 16, illustrated in FIG. 4, was immersed in hydrochloric acid having a pH of 3, and the time that elapsed before cracking occurred in the bent portion 17 was determined for the evaluation. The determination that cracking occurred was made when it was confirmed that a crack propagated 5 mm or greater from the sheared end face 12 on the surface of the steel sheet in the bent portion 17. The maximum immersion time was 100 hours. Specimens that did not crack even when they were immersed for a time of 100 hours were given a rating of "a", specimens that cracked when they were immersed for a time of 50 hours or more and less than 100 hours were given a rating of "b", specimens that cracked when they were immersed for a time of 10 hours or more and less than 50 hours were given a rating of "c", and specimens that cracked when they were immersed for a time of less than 10 hours were given a rating of "d". The ranking of the delayed fracture resistance was in the order of a (excellent)>b>c>d (poor). "a" and "b" were considered to be "pass". Regarding the ratings b, c, and d, the longer the immersion time before cracking, the better the delayed fracture resistance.

The results obtained are shown in Tables 2-1 and 2-2.

TABLE 1

| Symbol | Resin | Inorganic Material |
|---|---|---|
| A | — | — |
| B | Epoxy resin | Zinc-based oxide |
| C | Epoxy resin | Crystalline layered material |
| D | Acrylic resin | Zinc-based oxide |

TABLE 2-1

| | Type of Steel Sheet | | | | | | | | Coated Layer | | Outer Coating |
|---|---|---|---|---|---|---|---|---|---|---|---|
| | Chemical Composition (mass %) | | | | | Tensile Strength | Thickness | Thickness | Type of | Coating Weight | Outer Coating |
| No. | C | Si | Mn | P | S | (MPa) | T1 mm | T2 mm | Coating | (g/m$^2$) | Symbol |
| 1 | 0.197 | 10.43 | 1.56 | 0.01 | 0.0005 | 1470 | 1.4 | — | — | — | A |
| 2 | | | | | | 1470 | 1.4 | — | — | — | B |
| 3 | | | | | | 1470 | 1.4 | — | — | — | B |
| 4 | | | | | | 1470 | 1.4 | — | — | — | B |
| 5 | | | | | | 1470 | 1.4 | — | — | — | B |
| 6 | | | | | | 1470 | 1.4 | — | — | — | B |
| 7 | | | | | | 1470 | 1.4 | — | — | — | B |
| 8 | | | | | | 1470 | 1.4 | — | — | — | B |
| 9 | | | | | | 1470 | 1.4 | — | — | — | B |
| 10 | | | | | | 1470 | 1.4 | — | — | — | C |
| 11 | | | | | | 1470 | 1.4 | — | — | — | C |
| 12 | | | | | | 1470 | 1.4 | — | — | — | C |
| 13 | | | | | | 1470 | 1.4 | — | — | — | C |
| 14 | | | | | | 1470 | 1.4 | — | — | — | D |
| 15 | | | | | | 1470 | 1.4 | — | — | — | D |
| 16 | | | | | | 1470 | 1.4 | — | — | — | D |
| 17 | | | | | | 1470 | 1.4 | — | — | — | D |
| 18 | 0.459 | 0.20 | 0.73 | 0.01 | 0.0027 | 1470 | 1.4 | — | — | — | A |
| 19 | | | | | | 1470 | 1.4 | — | — | — | B |
| 20 | 0.197 | 0.43 | 1.56 | 0.01 | 0.0005 | 1470 | 1.4 | — | — | — | B |

TABLE 2-1-continued

| No. | | | | | | | | | | | |
|---|---|---|---|---|---|---|---|---|---|---|---|
| 21 | | | | | | 1470 | 1.4 | — | — | — | B |
| 22 | | | | | | 1470 | 1.4 | — | — | — | B |
| 23 | | | | | | 1470 | 0.8 | — | — | — | B |
| 24 | | | | | | 1470 | 1.2 | — | — | — | B |
| 25 | | | | | | 1470 | 2.0 | — | — | — | B |
| 26 | | | | | | 1470 | 2.5 | — | — | — | B |
| 27 | | | | | | 1470 | 1.4 | — | — | — | B |
| 28 | | | | | | 1470 | 1.4 | — | — | — | B |
| 29 | | | | | | 1470 | 1.4 | — | — | — | B |
| 30 | | | | | | 1470 | 1.4 | — | — | — | B |
| 31 | | | | | | 1470 | 1.4 | — | — | — | B |
| 32 | 0.115 | 0.50 | 2.51 | 0.01 | 0.0005 | 1180 | 1.4 | — | — | — | A |
| 33 | | | | | | 1180 | 1.4 | — | — | — | B |
| 34 | 0.115 | 0.50 | 2.51 | 10.01 | 0.0005 | 1200 | 1.4 | — | — | — | A |
| 35 | | | | | | 1200 | 1.4 | — | — | — | B |
| 36 | 0.145 | 0.40 | 1.49 | 0.02 | 0.001 | 1320 | 1.4 | — | — | — | A |
| 37 | | | | | | 1320 | 1.4 | — | — | — | B |

| | Outer Coating | | | Shearing | | | Bending |
|---|---|---|---|---|---|---|---|
| | Ratio of Inorganic Material Concentration of Base-Steel-Side 20% Region to That of Outer-Surface- | Thickness t | Coefficient | Clearance | | Slide Mark Length | Bend Radius R1 |
| No. | Side 20% Region | (μm) | of Friction μ | mm | % | (mm) | (mm) |
| 1 | Not Measurable Because of Absence of Outer Coating | | | 0.070 | 5% | 0.9 | 7 |
| 2 | 1.0 | 0.28 | 0.14 | 0.070 | 5% | 0.7 | 7 |
| 3 | 1.5 | 0.38 | 0.12 | 0.070 | 5% | 0.6 | 7 |
| 4 | 1.5 | 0.42 | 0.12 | 0.070 | 5% | 0.6 | 7 |
| 5 | 1.5 | 0.44 | 0.12 | 0.070 | 5% | 0.6 | 7 |
| 6 | 1.5 | 0.48 | 0.12 | 0.070 | 5% | 0.5 | 7 |
| 7 | 1.5 | 0.54 | 0.12 | 0.070 | 5% | 0.3 | 7 |
| 8 | 1.7 | 1.04 | 0.11 | 0.070 | 5% | 0 | 7 |
| 9 | 2.0 | 2.10 | 0.10 | 0.070 | 5% | 0 | 7 |
| 10 | 1.0 | 0.14 | 0.09 | 0.070 | 5% | 0.6 | 7 |
| 11 | 1.5 | 0.41 | 0.09 | 0.070 | 5% | 0.2 | 7 |
| 12 | 1.8 | 0.91 | 0.08 | 0.070 | 5% | 0 | 7 |
| 13 | 2.1 | 1.96 | 0.08 | 0.070 | 5% | 0 | 7 |
| 14 | 1.0 | 0.23 | 0.19 | 0.070 | 5% | 0.8 | 7 |
| 15 | 1.5 | 0.55 | 0.17 | 0.070 | 5% | 0.4 | 7 |
| 16 | 1.6 | 0.90 | 0.15 | 0.070 | 5% | 0 | 7 |
| 17 | 1.9 | 2.04 | 0.13 | 0.070 | 5% | 0 | 7 |
| 18 | Not Measurable Because of Absence of Outer Coating | | | 0.070 | 5% | 1.0 | 7 |
| 19 | 1.6 | 0.94 | 0.11 | 0.070 | 5% | 0 | 7 |
| 20 | 1.7 | 1.01 | 0.11 | 0.070 | 5% | 0 | 7 |
| 21 | 1.7 | 1.04 | 0.11 | 0.070 | 5% | 0 | 6 |
| 22 | 1.7 | 1.08 | 0.11 | 0.070 | 5% | 0 | 5 |
| 23 | 1.7 | 1.08 | 0.11 | 0.040 | 5% | 0 | 8 |
| 24 | 1.7 | 1.02 | 0.11 | 0.060 | 5% | 0 | 8 |
| 25 | 1.6 | 0.94 | 0.11 | 0.100 | 5% | 0 | 8 |
| 26 | 1.7 | 0.91 | 0.11 | 0.125 | 5% | 0 | 8 |
| 27 | 1.6 | 0.95 | 0.11 | 0 | 0% | 0 | 7 |
| 28 | 1.6 | 1.05 | 0.11 | 0.028 | 2% | 0 | 7 |
| 29 | 1.7 | 1.02 | 0.11 | 0.140 | 10% | 0 | 7 |
| 30 | 1.7 | 1.04 | 0.11 | 0.280 | 20% | 0 | 7 |
| 31 | 1.7 | 1.08 | 0.11 | 0.420 | 30% | 0 | 7 |
| 32 | Not Measurable Because of Absence of Outer Coating | | | 0.070 | 5% | 1.0 | 7 |
| 33 | 1.6 | 0.99 | 0.11 | 0.070 | 5% | 0 | 7 |
| 34 | Not Measurable Because of Absence of Outer Coating | | | 0.070 | 5% | 0.8 | 7 |
| 35 | 1.6 | 0.94 | 0.11 | 0.070 | 5% | 0 | 7 |
| 36 | Not Measurable Because of Absence of Outer Coating | | | 0.070 | 5% | 0.7 | 7 |
| 37 | 1.7 | 1.01 | 0.11 | 0.070 | 5% | 0 | 7 |

| | Bending | | | | | Results of Evaluation of Delayed Fracture | | |
|---|---|---|---|---|---|---|---|---|
| | Bend Radius R2 | Number of Cracks | Number of Cracks | | | Resistance Time Before | | |
| No. | (mm) | N1 | N2 | (N1/R1)*T1 | (N2/R2)*T2 | Cracking | Rating | Notes |
| 1 | — | 12 | — | 2.4 | — | 4 | d | Comparative Example |
| 2 | — | 8 | — | 1.6 | — | 19 | c | Comparative Example |
| 3 | — | 6 | — | 1.2 | — | 52 | b | Example |

TABLE 2-1-continued

| No. | | | | | | Time Before Cracking | | |
|---|---|---|---|---|---|---|---|---|
| 4 | — | 6 | — | 1.2 | — | 60 | b | Example |
| 5 | — | 6 | — | 1.2 | — | 82 | b | Example |
| 6 | — | 4 | — | 0.8 | — | 84 | b | Example |
| 7 | — | 2 | — | 0.4 | — | 92 | b | Example |
| 8 | — | 0 | — | 0 | — | >100 | a | Example |
| 9 | — | 0 | — | 0 | — | >100 | a | Example |
| 10 | — | 6 | — | 1.2 | — | 33 | c | Comparative Example |
| 11 | — | 0 | — | 0 | — | >100 | a | Example |
| 12 | — | 0 | — | 0 | — | >100 | a | Example |
| 13 | — | 0 | — | 0 | — | >100 | a | Example |
| 14 | — | 7 | — | 1.4 | — | 28 | c | Comparative Example |
| 15 | — | 1 | — | 0.2 | — | >100 | a | Example |
| 16 | — | 0 | — | 0 | — | >100 | a | Example |
| 17 | — | 0 | — | 0 | — | >100 | a | Example |
| 18 | — | 8 | — | 1.6 | — | 15 | c | Comparative Example |
| 19 | — | 0 | — | 0 | — | >100 | a | Example |
| 20 | — | 0 | — | 0 | — | >100 | a | Example |
| 21 | — | 0 | — | 0 | — | >100 | a | Example |
| 22 | — | 0 | — | 0 | — | >100 | a | Example |
| 23 | — | 0 | — | 0 | — | >100 | a | Example |
| 24 | — | 0 | — | 0 | — | >100 | a | Example |
| 25 | — | 0 | — | 0 | — | >100 | a | Example |
| 26 | — | 0 | — | 0 | — | >100 | a | Example |
| 27 | — | 0 | — | 0 | — | >100 | a | Example |
| 28 | — | 0 | — | 0 | — | >100 | a | Example |
| 29 | — | 0 | — | 0 | — | >100 | a | Example |
| 30 | — | 0 | — | 0 | — | >100 | a | Example |
| 31 | — | 0 | — | 0 | — | >100 | a | Example |
| 32 | — | 6 | — | 1.2 | — | 44 | c | Comparative Example |
| 33 | — | 0 | — | 0 | — | >100 | a | Example |
| 34 | — | 8 | — | 1.6 | — | 39 | c | Comparative Example |
| 35 | — | 0 | — | 0 | — | >100 | a | Example |
| 36 | — | 9 | — | 1.8 | — | 9 | d | Comparative Example |
| 37 | — | 0 | — | 0 | — | >100 | a | Example |

"—" means "not applicable".

The underline means "outside the scope of the present invention".

In the "Time Before Cracking" column, ">100" means that no cracking was observed even after 100 hours and thus that the sample was determined to have a time before cracking of over 100 hours.

In the "Shearing" column, "Clearance (mm)" is a set value of the apparatus.

TABLE 2-2

| | Type of Steel Sheet | | | | | | | | Coated Layer | | Outer Coating |
|---|---|---|---|---|---|---|---|---|---|---|---|
| | Chemical Composition (mass %) | | | | | Tensile Strength | Thick-ness | Thick-ness | | Coating Weight | Outer Coating |
| No. | C | Si | Mn | P | S | (MPa) | T1 mm | T2 mm | Type of Coating | (g/m²) | Symbol |
| 38 | 0.197 | 0.43 | 1.56 | 0.01 | 0.0005 | 1470 | — | 1.4 | Hot-dip galvannealed steel sheet (Fe: 10 mass %) | 45 | A |
| 39 | | | | | | 1470 | — | 1.4 | Hot-dip galvannealed steel sheet (Fe: 10 mass %) | 45 | B |
| 40 | | | | | | 1470 | — | 1.4 | Hot-dip galvannealed steel sheet (Fe: 10 mass %) | 45 | B |
| 41 | | | | | | 1470 | — | 1.4 | Hot-dip galvannealed steel sheet (Fe: 10 mass %) | 45 | B |
| 42 | | | | | | 1470 | — | 1.4 | Hot-dip galvannealed steel sheet (Fe: 10 mass %) | 45 | B |
| 43 | | | | | | 1470 | — | 1.4 | Hot-dip galvannealed steel sheet (Fe: 10 mass %) | 45 | B |
| 44 | | | | | | 1470 | — | 1.4 | Hot-dip galvannealed steel sheet (Fe: 10 mass %) | 45 | B |
| 45 | | | | | | 1470 | — | 1.4 | Hot-dip galvannealed steel sheet (Fe: 10 mass %) | 45 | B |
| 46 | | | | | | 1470 | — | 1.4 | Hot-dip galvannealed steel sheet (Fe: 10 mass %) | 45 | C |
| 47 | | | | | | 1470 | — | 1.4 | Hot-dip galvannealed steel sheet (Fe: 10 mass %) | 45 | C |
| 48 | | | | | | 1470 | — | 1.4 | Hot-dip galvannealed steel sheet (Fe: 10 mass %) | 45 | C |
| 49 | | | | | | 1470 | — | 1.4 | Hot-dip galvannealed steel sheet (Fe: 10 mass %) | 45 | C |
| 50 | | | | | | 1470 | — | 1.4 | Hot-dip galvannealed steel sheet (Fe: 10 mass %) | 45 | D |
| 51 | | | | | | 1470 | — | 1.4 | Hot-dip galvannealed steel sheet (Fe: 10 mass %) | 45 | D |
| 52 | | | | | | 1470 | — | 1.4 | Hot-dip galvannealed steel sheet (Fe: 10 mass %) | 45 | D |
| 53 | | | | | | 1470 | — | 1.4 | Hot-dip galvannealed steel sheet (Fe: 10 mass %) | 45 | D |
| 54 | | | | | | 1470 | — | 1.4 | Hot-dip galvanized steel sheet | 45 | A |
| 55 | | | | | | 1470 | — | 1.4 | Hot-dip galvanized steel sheet | 45 | B |
| 56 | | | | | | 1470 | — | 1.4 | Zn—Al—Mg coated steel sheet (Al: 6 mass %, Mg: 3 mass %) | 45 | A |
| 57 | | | | | | 1470 | — | 1.4 | Zn—Al—Mg coated steel sheet (Al: 6 mass %, Mg: 3 mass %) | 45 | B |
| 58 | | | | | | 1470 | — | 1.4 | Electrogalvanized steel sheet | 45 | A |
| 59 | | | | | | 1470 | — | 1.4 | Electrogalvanized steel sheet | 45 | B |
| 60 | | | | | | 1470 | — | 1.4 | Electrogalvanized steel sheet | 30 | B |
| 61 | | | | | | 1470 | — | 1.4 | Electrogalvanized steel sheet | 100 | B |
| 62 | 0.459 | 0.20 | 0.73 | 0.01 | 0.0027 | 1470 | — | 1.4 | Hot-dip galvannealed steel sheet (Fe: 10 mass %) | 45 | A |
| 63 | | | | | | 1470 | — | 1.4 | Hot-dip galvannealed steel sheet (Fe: 10 mass %) | 45 | B |
| 64 | 0.197 | 0.43 | 1.56 | 0.01 | 0.0005 | 1470 | — | 1.4 | Hot-dip galvannealed steel sheet (Fe: 10 mass %) | 45 | B |

TABLE 2-2-continued

| No. | | | | | | | | | | | |
|---|---|---|---|---|---|---|---|---|---|---|---|
| 65 | | | | | | 1470 | — | 1.4 | Hot-dip galvannealed steel sheet (Fe: 10 mass %) | 45 | B |
| 66 | | | | | | 1470 | — | 1.4 | Hot-dip galvannealed steel sheet (Fe: 10 mass %) | 45 | B |
| 67 | | | | | | 1470 | — | 0.8 | Hot-dip galvannealed steel sheet (Fe: 10 mass %) | 45 | B |
| 68 | | | | | | 1470 | — | 1.2 | Hot-dip galvannealed steel sheet (Fe: 10 mass %) | 45 | B |
| 69 | | | | | | 1470 | — | 2.0 | Hot-dip galvannealed steel sheet (Fe: 10 mass %) | 45 | B |
| 70 | | | | | | 1470 | — | 2.5 | Hot-dip galvannealed steel sheet (Fe: 10 mass %) | 45 | B |
| 71 | | | | | | 1470 | — | 1.4 | Hot-dip galvannealed steel sheet (Fe: 10 mass %) | 45 | B |
| 72 | | | | | | 1470 | — | 1.4 | Hot-dip galvannealed steel sheet (Fe: 10 mass %) | 45 | B |
| 73 | | | | | | 1470 | — | 1.4 | Hot-dip galvannealed steel sheet (Fe: 10 mass %) | 45 | B |
| 74 | | | | | | 1470 | — | 1.4 | Hot-dip galvannealed steel sheet (Fe: 10 mass %) | 45 | B |
| 75 | | | | | | 1470 | — | 1.4 | Hot-dip galvannealed steel sheet (Fe: 10 mass %) | 45 | B |
| 76 | 0.115 | 0.50 | 2.51 | 0.01 | 0.0005 | 1180 | — | 1.4 | Hot-dip galvannealed steel sheet (Fe: 10 mass %) | 45 | A |
| 77 | | | | | | 1180 | — | 1.4 | Hot-dip galvannealed steel sheet (Fe: 10 mass %) | 45 | B |
| 78 | 0.115 | 0.50 | 2.51 | 0.01 | 0.0005 | 1200 | — | 1.4 | Hot-dip galvannealed steel sheet (Fe: 10 mass %) | 45 | A |
| 79 | | | | | | 1200 | — | 1.4 | Hot-dip galvannealed steel sheet (Fe: 10 mass %) | 45 | B |
| 80 | 0.145 | 0.40 | 1.49 | 0.02 | 0.001 | 1320 | — | 1.4 | Hot-dip galvannealed steel sheet (Fe: 10 mass %) | 45 | A |
| 81 | | | | | | 1320 | — | 1.4 | Hot-dip galvannealed steel sheet (Fe: 10 mass %) | 45 | B |

| | Outer Coating | | | | | |
|---|---|---|---|---|---|---|
| | Ratio of Inorganic Material Concentration of Base-Steel-Side | | | Shearing | | Bending |
| | 20% Region to That of Outer-Surface- | Thickness t | Coefficient | Clearance | | Slide Mark Length |
| | | | | | | Bend Radius R1 |
| No. | Side 20% Region | (μm) | of Friction μ | mm | % | (mm) | (mm) |

| No. | Side 20% Region | (μm) | of Friction μ | mm | % | Slide Mark Length (mm) | Bend Radius R1 (mm) |
|---|---|---|---|---|---|---|---|
| 38 | Not Measurable Because of Absence of Outer Coating | | | 0.070 | 5% | 1.2 | — |
| 39 | 1.0 | 0.26 | 0.14 | 0.070 | 5% | 0.8 | — |
| 40 | 1.5 | 0.38 | 0.12 | 0.070 | 5% | 0.6 | — |
| 41 | 1.5 | 0.41 | 0.12 | 0.070 | 5% | 0.6 | — |
| 42 | 1.5 | 0.43 | 0.12 | 0.070 | 5% | 0.6 | — |
| 43 | 1.5 | 0.47 | 0.12 | 0.070 | 5% | 0.2 | — |
| 44 | 1.7 | 1.06 | 0.11 | 0.070 | 5% | 0 | — |
| 45 | 2.0 | 1.91 | 0.10 | 0.070 | 5% | 0 | — |
| 46 | 1.0 | 0.22 | 0.09 | 0.070 | 5% | 0.8 | — |
| 47 | 1.5 | 0.60 | 0.09 | 0.070 | 5% | 0 | — |
| 48 | 1.8 | 0.93 | 0.08 | 0.070 | 5% | 0 | — |
| 49 | 2.1 | 1.99 | 0.08 | 0.070 | 5% | 0 | — |
| 50 | 1.0 | 0.20 | 0.19 | 0.070 | 5% | 0.8 | — |
| 51 | 1.5 | 0.60 | 0.17 | 0.070 | 5% | 0.3 | — |
| 52 | 1.6 | 1.02 | 0.15 | 0.070 | 5% | 0.1 | — |
| 53 | 1.9 | 1.95 | 0.13 | 0.070 | 5% | 0 | — |
| 54 | Not Measurable Because of Absence of Outer Coating | | | 0.070 | 5% | 1.0 | — |
| 55 | 1.7 | 1.04 | 0.11 | 0.070 | 5% | 0.1 | — |
| 56 | Not Measurable Because of Absence of Outer Coating | | | 0.070 | 5% | 1.3 | — |
| 57 | 1.7 | 1.08 | 0.11 | 0.070 | 5% | 0 | — |
| 58 | Not Measurable Because of Absence of Outer Coating | | | 0.070 | 5% | 1.3 | — |
| 59 | 1.7 | 1.04 | 0.11 | 0.070 | 5% | 0 | — |
| 60 | 1.8 | 0.99 | 0.11 | 0.070 | 5% | 0 | — |
| 61 | 1.8 | 1.07 | 0.11 | 0.070 | 5% | 0 | — |
| 62 | Not Measurable Because of Absence of Outer Coating | | | 0.070 | 5% | 1.2 | — |
| 63 | 1.6 | 1.06 | 0.11 | 0.070 | 5% | 0 | — |
| 64 | 1.7 | 0.91 | 0.11 | 0.070 | 5% | 0 | — |
| 65 | 1.7 | 0.95 | 0.11 | 0.070 | 5% | 0 | — |
| 66 | 1.7 | 0.95 | 0.11 | 0.070 | 5% | 0 | — |
| 67 | 1.6 | 1.08 | 0.11 | 0.040 | 5% | 0 | — |
| 68 | 1.7 | 1.08 | 0.11 | 0.060 | 5% | 0 | — |
| 69 | 1.6 | 0.91 | 0.11 | 0.100 | 5% | 0 | — |
| 70 | 1.7 | 1.08 | 0.11 | 0.125 | 5% | 0 | — |
| 71 | 1.7 | 0.97 | 0.11 | 0 | 0% | 0 | — |
| 72 | 1.7 | 1.00 | 0.11 | 0.028 | 2% | 0 | — |
| 73 | 1.7 | 1.00 | 0.11 | 0.140 | 10% | 0 | — |
| 74 | 1.6 | 0.99 | 0.11 | 0.280 | 20% | 0 | — |
| 75 | 1.7 | 1.06 | 0.11 | 0.420 | 30% | 0 | — |
| 76 | Not Measurable Because of Absence of Outer Coating | | | 0.070 | 5% | 0.8 | — |
| 77 | 1.5 | 0.98 | 0.11 | 0.070 | 5% | 0 | — |
| 78 | Not Measurable Because of Absence of Outer Coating | | | 0.070 | 5% | 1.1 | — |
| 79 | 1.6 | 1.04 | 0.11 | 0.070 | 5% | 0 | — |
| 80 | Not Measurable Because of Absence of Outer Coating | | | 0.070 | 5% | 1.0 | — |
| 81 | 1.8 | 0.97 | 0.11 | 0.070 | 5% | 0 | — |

TABLE 2-2-continued

| | | Bending | | | | Results of Evaluation of Delayed Fracture Resistance | | |
| | Bend Radius R2 (mm) | Number of Cracks N1 | Number of Cracks N2 | (N1/R1)*T1 | (N2/R2)*T2 | Time Before Cracking | Rating | Notes |
| No. | | | | | | | | |
|---|---|---|---|---|---|---|---|---|
| 38 | 7 | — | 14 | — | 2.8 | 2 | d | Comparative Example |
| 39 | 7 | — | 6 | — | 1.2 | 21 | c | Comparative Example |
| 40 | 7 | — | 6 | — | 1.2 | 61 | b | Example |
| 41 | 7 | — | 6 | — | 1.2 | 70 | b | Example |
| 42 | 7 | — | 4 | — | 0.8 | 77 | b | Example |
| 43 | 7 | — | 2 | — | 0.4 | 94 | b | Example |
| 44 | 7 | — | 0 | — | 0 | >100 | a | Example |
| 45 | 7 | — | 0 | — | 0 | >100 | a | Example |
| 46 | 7 | — | 8 | — | 1.6 | 28 | c | Comparative Example |
| 47 | 7 | — | 0 | — | 0 | >100 | a | Example |
| 48 | 7 | — | 0 | — | 0 | >100 | a | Example |
| 49 | 7 | — | 0 | — | 0 | >100 | a | Example |
| 50 | 7 | — | 6 | — | 1.2 | 30 | c | Comparative Example |
| 51 | 7 | — | 0 | — | 0 | >100 | a | Example |
| 52 | 7 | — | 0 | — | 0 | >100 | a | Example |
| 53 | 7 | — | 0 | — | 0 | >100 | a | Example |
| 54 | 7 | — | 15 | — | 3 | 5 | d | Comparative Example |
| 55 | 7 | — | 2 | — | 0.4 | 88 | b | Example |
| 56 | 7 | — | 19 | — | 3.8 | 2 | d | Comparative Example |
| 57 | 7 | — | 0 | — | 0 | >100 | a | Example |
| 58 | 7 | — | 16 | — | 3.2 | 2 | d | Comparative Example |
| 59 | 7 | — | 0 | — | 0 | >100 | a | Example |
| 60 | 7 | — | 0 | — | 0 | >100 | a | Example |
| 61 | 7 | — | 0 | — | 0 | >100 | a | Example |
| 62 | 7 | — | 16 | — | 3.2 | 6 | d | Comparative Example |
| 63 | 7 | — | 0 | — | 0 | >100 | a | Example |
| 64 | 7 | — | 0 | — | 0 | >100 | a | Example |
| 65 | 6 | — | 0 | — | 0 | >100 | a | Example |
| 66 | 5 | — | 0 | — | 0 | >100 | a | Example |
| 67 | 8 | — | 0 | — | 0 | >100 | a | Example |
| 68 | 8 | — | 0 | — | 0 | >100 | a | Example |
| 69 | 8 | — | 0 | — | 0 | >100 | a | Example |
| 70 | 8 | — | 0 | — | 0 | >100 | a | Example |
| 71 | 7 | — | 0 | — | 0 | >100 | a | Example |
| 72 | 7 | — | 0 | — | 0 | >100 | a | Example |
| 73 | 7 | — | 0 | — | 0 | >100 | a | Example |
| 74 | 7 | — | 0 | — | 0 | >100 | a | Example |
| 75 | 7 | — | 0 | — | 0 | >100 | a | Example |
| 76 | 7 | — | 6 | — | 1.2 | 19 | c | Comparative Example |
| 77 | 7 | — | 0 | — | 0 | >100 | a | Example |
| 78 | 7 | — | 9 | — | 1.8 | 10 | c | Comparative Example |
| 79 | 7 | — | 0 | — | 0 | >100 | a | Example |
| 80 | 7 | — | 11 | — | 2.2 | 8 | d | Comparative Example |
| 81 | 7 | — | 0 | — | 0 | >100 | a | Example |

"—" means "not applicable".
The underline means "outside the scope of the present invention".
In the "Time Before Cracking" column, ">100" means that no cracking was observed even after 100 hours and thus that the sample was determined to have a time before cracking of over 100 hours.
In the "Shearing" column, "Clearance (mm)" is a set value of the apparatus.

Tables 2-1 and 2-2 demonstrate that the Examples all had excellent delayed fracture resistance. In contrast, Comparative Examples had poor delayed fracture resistance.

REFERENCE SIGNS LIST 1 sample for measurement of coefficient of friction
2 sample stage
3 slide table
4 roller
5 slide table support
6 bead
7 first load cell
8 second load cell
9 rail
10 portion with which blade comes into contact (slide mark)
11 slide mark length
12 sheared end face
13 surface of steel sheet (surface having outer coating)
14 test specimen
15 post-bending test specimen
16 post-bolt-tightening test specimen
17 bent portion
18 bend R terminal portion
19 other bend R terminal portion
20 bend radius R
N pressing load
F sliding resistance force

The invention claimed is:

1. A steel sheet comprising a single-layered outer coating disposed on a surface, the single-layered outer coating including an organic resin and an inorganic material, the steel sheet having a tensile strength of 1180 MPa or greater, wherein in the single-layered outer coating, a concentration of the inorganic material in a region of the single-layered outer coating, which is a region extending to 20% of a thickness of the single-layered outer coating from a steel-sheet-side, is higher than a concentration of the inorganic material in another region of the single-layered outer coating, which is a region extending to 20% of the thickness from an outer-surface-side.

2. The steel sheet according to claim 1, wherein the thickness of the single-layered outer coating is 0.4 µm or greater.

3. The steel sheet according to claim 1, wherein the steel sheet satisfies one or both of conditions (A) and (B), described below:

(A) the steel sheet is sheared, and a surface of the steel sheet in a sheared end portion has a slide mark having a length of 0.5 mm or less, and (B) the steel sheet is bent, and N1 satisfies equation (1), where N1 is the number of cracks formed in a sheared end face, $$(N1/R1) \times T1 \leq 1.0 \tag{1}$$

where N1 is the number of cracks formed in the sheared end face of a bent portion, R1 is a bend radius (mm) of the bent portion in which the number of cracks is evaluated, and T1 is a pre-processing thickness (mm) of the steel sheet.

4. A coated steel sheet comprising a single-layered outer coating disposed on a surface of a coated layer, the single-layered outer coating including an organic resin and an inorganic material, the coated steel sheet including a substrate steel sheet having a tensile strength of 1180 MPa or greater, wherein in the single-layered outer coating, a concentration of the inorganic material in a region of the single-layered outer coating, which is a region extending to 20% of a thickness of the single-layered outer coating from a steel-sheet-side, is higher than a concentration of the inorganic material in another region of the single-layered outer coating, which is a region extending to 20% of the thickness from an outer-surface-side.

5. The coated steel sheet according to claim 4, wherein the thickness of the single-layered outer coating is 0.4 µm or greater.

6. The coated steel sheet according to claim 4, wherein the coated steel sheet satisfies one or both of conditions (C) and (D), described below:

(C) the coated steel sheet is sheared, and a surface of the coated steel sheet in a sheared end portion has a slide mark having a length of 0.5 mm or less, and (D) the coated steel sheet is bent, and N2 satisfies equation (2), where N2 is the number of cracks formed in a sheared end face, $$(N2/R2) \times T2 \leq 1.0 \tag{2}$$

where N2 is the number of cracks formed in the sheared end face of a bent portion, R2 is a bend radius (mm) of the bent portion in which the number of cracks is evaluated, and T2 is a pre-processing thickness (mm) of the coated steel sheet.

7. A press-formed product resulting from press-forming of the steel sheet according to claim 1.

8. A press-formed product resulting from press-forming of the steel sheet according to claim 3.

9. A press-formed product resulting from press-forming of the coated steel sheet according to claim 4.

10. A press-formed product resulting from press-forming of the coated steel sheet according to claim 6.

11. A method for manufacturing a press-formed product, the method comprising the step of press-forming the steel sheet according to claim 1.

12. A method for manufacturing a press-formed product, the method comprising the step of press-forming the coated steel sheet according to claim 4.

13. A method for manufacturing a processed member, the method comprising the steps of shearing and/or bending the steel sheet according to claim 1.

14. A method for manufacturing a processed member, the method comprising the steps of shearing and/or bending the coated steel sheet according to claim 4.

15. A processed member comprising the steel sheet according to claim 1, wherein the steel sheet satisfies one or both of (A) and (B), described below:

(A) a surface of the steel sheet in a sheared end portion has a slide mark having a length of 0.5 mm or less, and (B) N1 satisfies equation (1), where N1 is the number of cracks formed in a sheared end face, $$(N1/R1) \times T1 \leq 1.0 \tag{1}$$

where N1 is the number of cracks formed in the sheared end face of a bent portion, R1 is a bend radius (mm) of the bent portion in which the number of cracks is evaluated, and T1 is a pre-processing thickness (mm) of the steel sheet.

16. A processed member comprising the coated steel sheet according to claim 4, wherein the coated steel sheet satisfies one or both of (C) and (D), described below:

(C) a surface of the coated steel sheet in a sheared end portion has a slide mark having a length of 0.5 mm or less, and (D) N2 satisfies equation (2), where N2 is the number of cracks formed in a sheared end face, $$(N2/R2) \times T2 \leq 1.0 \tag{2}$$

where N2 is the number of cracks formed in the sheared end face of a bent portion, R2 is a bend radius (mm) of the bent portion in which the number of cracks is evaluated, and T2 is a pre-processing thickness (mm) of the coated steel sheet.

* * * * *